(12) United States Patent
Wang et al.

(10) Patent No.: US 7,715,082 B2
(45) Date of Patent: May 11, 2010

(54) ELECTROCHROMIC DEVICES BASED ON LITHIUM INSERTION

(75) Inventors: Zhongchun Wang, Santa Rosa, CA (US); Paul P. Nguyen, San Jose, CA (US)

(73) Assignee: Soladigm, Inc., Milpitas, CA (US)

( * ) Notice: Subject to any disclaimer, the term of this patent is extended or adjusted under 35 U.S.C. 154(b) by 0 days.

(21) Appl. No.: 12/165,292

(22) Filed: Jun. 30, 2008

(65) Prior Publication Data

US 2009/0323158 A1    Dec. 31, 2009

(51) Int. Cl.
*G02F 1/153* (2006.01)
*G02F 1/01* (2006.01)
*G09G 3/19* (2006.01)
*G09G 3/38* (2006.01)

(52) U.S. Cl. .................. 359/269; 359/277; 345/49; 345/105

(58) Field of Classification Search ......... 359/265–270, 359/272–275, 277, 245–247, 254; 345/49, 345/105; 349/182–186; 348/814; 250/70; 438/929
See application file for complete search history.

(56) References Cited

U.S. PATENT DOCUMENTS

| | | | |
|---|---|---|---|
| 3,521,941 A | 7/1970 | Deb et al. | |
| 4,139,275 A | 2/1979 | Yano et al. | |
| 4,293,194 A | 10/1981 | Takahashi | |
| 4,375,319 A | 3/1983 | Wada et al. | |
| 4,421,985 A | 12/1983 | Billingsley et al. | |
| 4,524,385 A | 6/1985 | Billingsley et al. | |
| 4,830,471 A | 5/1989 | Demiryont | |
| 4,960,324 A | 10/1990 | Brown | |
| 5,066,111 A | 11/1991 | Singleton et al. | |
| 5,124,832 A | 6/1992 | Greenberg et al. | |
| 5,164,855 A | 11/1992 | Buffat et al. | |
| 5,177,628 A | 1/1993 | Moddel | |
| 5,209,980 A | 5/1993 | Spindler | |
| 5,215,821 A | 6/1993 | Ho | |
| 5,260,821 A | 11/1993 | Chu et al. | |
| 5,327,281 A | 7/1994 | Cogen et al. | |
| 5,471,338 A | 11/1995 | Yu et al. | |
| 5,471,554 A | 11/1995 | Rukavina et al. | |
| 5,514,496 A | 5/1996 | Mishima et al. | |
| 5,520,851 A | 5/1996 | Yu et al. | |
| 5,532,869 A | 7/1996 | Goldner et al. | |
| 5,585,959 A | 12/1996 | Brown et al. | |
| 5,598,293 A | 1/1997 | Green | |
| 5,618,390 A | 4/1997 | Yu et al. | |
| 5,635,729 A | 6/1997 | Griessen et al. | |

(Continued)

FOREIGN PATENT DOCUMENTS

WO    WO 00/17706    3/2000

*Primary Examiner*—Scott J Sugarman
*Assistant Examiner*—Dawayne A Pinkney
(74) *Attorney, Agent, or Firm*—Joseph P. Curtin, L.L.C.

(57) ABSTRACT

An electrochromic switching device comprises a counter electrode, an active electrode and an electrolyte layer disposed between the counter electrode and the active electrode. The active electrode comprises at least one of an oxide, a nitride, an oxynitrides, a partial oxide, a partial nitride and a partial oxynitride of at least one of Sb, Bi, Si, Ge, Sn, Te, N, P, As, Ga, In, Al, C, Pb and I. Upon application of a current to the electrochromic switching device, a compound comprising at least one of the alkali and the alkaline earth metal ion and an element of the active electrode is formed as part of the active electrode.

15 Claims, 1 Drawing Sheet

U.S. PATENT DOCUMENTS

| | | |
|---|---|---|
| 5,657,150 A | 8/1997 | Kallman et al. |
| 5,721,633 A | 2/1998 | Nagai et al. |
| 5,777,780 A | 7/1998 | Terada et al. |
| 5,793,518 A | 8/1998 | Lefrou et al. |
| 5,798,860 A | 8/1998 | Yu et al. |
| 5,831,760 A | 11/1998 | Hashimoto et al. |
| 5,849,415 A | 12/1998 | Shalaby et al. |
| 5,905,590 A | 5/1999 | Van Der Sluis et al. |
| 5,916,398 A | 6/1999 | Coleman et al. |
| 5,953,150 A | 9/1999 | Smarto et al. |
| 5,969,847 A | 10/1999 | Coleman et al. |
| 5,970,187 A | 10/1999 | Notten et al. |
| 5,973,818 A | 10/1999 | Sjursen et al. |
| 5,973,819 A | 10/1999 | Pletcher et al. |
| 5,978,126 A | 11/1999 | Sjursen |
| 5,995,273 A | 11/1999 | Chandrasekhar |
| 6,006,582 A | 12/1999 | Bhandari et al. |
| 6,010,220 A | 1/2000 | Smarto |
| 6,033,518 A | 3/2000 | Backfisch |
| 6,039,850 A | 3/2000 | Schulz |
| 6,047,107 A | 4/2000 | Roozeboom et al. |
| 6,066,269 A | 5/2000 | Wei et al. |
| 6,067,184 A | 5/2000 | Bonhote et al. |
| 6,091,184 A | 7/2000 | De Vries |
| 6,094,292 A | 7/2000 | Goldner et al. |
| 6,099,117 A | 8/2000 | Gregory |
| 6,101,298 A | 8/2000 | Den Broeder et al. |
| 6,110,016 A | 8/2000 | Coleman et al. |
| 6,118,572 A | 9/2000 | Kostecki et al. |
| 6,120,696 A | 9/2000 | Armand et al. |
| 6,127,516 A | 10/2000 | Bard et al. |
| 6,136,161 A | 10/2000 | Yu et al. |
| 6,163,926 A | 12/2000 | Watanabe |
| 6,165,547 A | 12/2000 | Leedom |
| 6,165,643 A | 12/2000 | Doyle et al. |
| 6,166,849 A | 12/2000 | Coleman et al. |
| 6,173,116 B1 | 1/2001 | Roozeboom et al. |
| 6,177,130 B1 | 1/2001 | Frey |
| 6,185,034 B1 | 2/2001 | Nakamura et al. |
| 6,198,225 B1 | 3/2001 | Kano et al. |
| 6,211,995 B1 | 4/2001 | Azens et al. |
| 6,213,602 B1 | 4/2001 | Smarto |
| 6,214,261 B1 | 4/2001 | Smarto et al. |
| 6,232,782 B1 | 5/2001 | Kacprowicz et al. |
| 6,259,549 B1 | 7/2001 | Leupolz et al. |
| 6,265,222 B1 | 7/2001 | DiMeo, Jr. et al. |
| 6,291,096 B1 | 9/2001 | Klein |
| 6,310,725 B1 | 10/2001 | Duine et al. |
| 6,317,531 B1 | 11/2001 | Chen et al. |
| 6,356,376 B1 | 3/2002 | Tonar et al. |
| 6,383,956 B2 | 5/2002 | Hawryluk et al. |
| 6,395,350 B1 | 5/2002 | Balkus, Jr. et al. |
| 6,420,071 B1 | 7/2002 | Lee et al. |
| 6,437,900 B1 | 8/2002 | Cornelissen et al. |
| 6,495,390 B2 | 12/2002 | Hawryluk et al. |
| 6,608,713 B2 | 8/2003 | Ouwerkerk et al. |
| 6,620,342 B1 | 9/2003 | Burchill et al. |
| 6,815,122 B2 | 11/2004 | Barker et al. |
| 6,844,115 B2 | 1/2005 | Gan et al. |
| 7,042,615 B2 | 5/2006 | Richardson |
| 7,286,061 B2 | 10/2007 | Atkinson |
| 2002/0154535 A1 | 10/2002 | Bociam et al. |
| 2002/0160270 A1 | 10/2002 | Bronstert et al. |
| 2004/0021921 A1* | 2/2004 | Richardson .............. 359/196 |

* cited by examiner

ELECTROCHROMIC DEVICES BASED ON LITHIUM INSERTION

BACKGROUND

The subject matter disclosed herein relates to electrochromic devices that optically switch upon the application of electric current. More particularly, the subject matter disclosed herein relates to the optical properties of oxides, nitrides, oxynitrides, partial oxides, partial nitrides and partial oxynitrides of metallic and semi-metallic materials that can be changed by addition or removal of lithium and, accordingly, the subject matter disclosed herein relates to their use in thin films in switching devices.

BRIEF DESCRIPTION OF THE DRAWING

The subject matter disclosed herein is illustrated by way of example and not by limitation in the accompanying figures in which like reference numerals indicate similar elements and in which:

The sole FIGURE depicts one exemplary embodiment of an electrochromic device in accordance with the subject matter disclosed herein.

DETAILED DESCRIPTION

Figure 1:
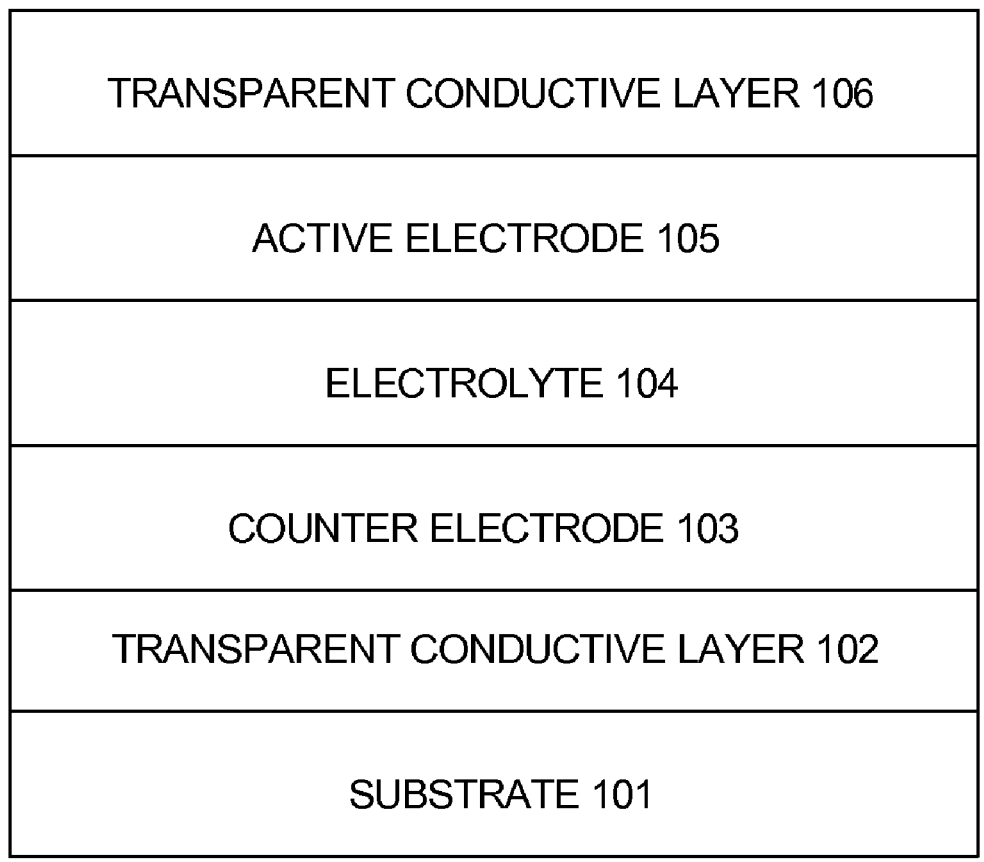

The word "exemplary," as used herein, means "serving as an example, instance, or illustration." Any embodiment described herein as "exemplary" is not to be construed as necessarily preferred or advantageous over other embodiments. Also as used herein, the term "switching device" is meant to include a device capable of exhibiting a change of light transmission or reflection in response to an applied electric field. A "switching film," as used herein, is a film of materials described herein that undergo a reversible change in light transmittance or reflectance. As used herein, the term "pnicogens" includes N, P, As, Sb and Bi. As used herein, the term "chalcogenides" includes Group 7A elements O, S, Se and Te. The term "alkali metals," as used herein, includes Li, Na, K, Rb, Cs and Fr. The term "alkaline earth metals," as used herein, includes Be, Mg, Ca, Sr, Ba and Ra The subject matter disclosed herein relates to electrochromic devices that optically switch via lithium-ion insertion upon the application of electric current. More particularly, the subject matter disclosed herein relates to films of oxides, nitrides, oxynitrides, partial oxides, partial nitrides and/or partial oxynitrides of Sb, Bi, Si, Ge, Sn, Te, N, P, As, Ga, In, Al, C, Pb, I, and/or the compounds that are formed with each other. Thin switching films formed from these materials have improved durability over conventional reflective metal films, and improved switching ranges of transmittance and reflectance. Additionally, thin switching films formed from these materials are suitable for optical switching elements, thin film displays, sunroofs, rear-view mirrors, and architectural materials.

An electrochromic device according to the subject matter disclosed herein can appear in a transparent state (enabling one to see through the device), or in a reflecting and/or absorbing state. The general structure of electrochromic devices suitable for use with the subject matter disclosed herein are well known. For example, devices that are suitable for use with the subject matter disclosed herein comprise, but are not limited to, the devices disclosed in U.S. Pat. Nos. 6,211,995 B1 to Azens et al., 6,094,292 to Goldner et al., 5,970,187 to Notten et al., 5,831,760 to Hashimoto et al., 5,793,518 to Lefrou et al., 5,777,780 to Terada et al., 5,532, 869 to Goldner et al., 4,830,471 to Demiryont, and 4,293,194 to Takahashi, the disclosure of each being incorporated by reference herein. Electrochromic devices disclosed herein may be made according to techniques generally disclosed in U.S. Pat. No. 5,171,413 to Amtz et al., the disclosure of which is incorporated by reference herein. Films operating via lithium-ion insertion have been characterized by, for example, C. G. Granqvist, Handbook of Inorganic Electrochromic Materials, Elsevier, Amsterdam (1995), which is incorporated by reference herein.

The sole FIGURE depicts one exemplary embodiment of an electrochromic device 100 in accordance with the subject matter disclosed herein. Electrochromic device 100 comprises a transparent substrate 101, a transparent conductive layer 102 that is formed in a well-known manner on substrate 101, a counter electrode 103 that is formed in a well-known manner on transparent conductive layer 102, an electrolyte layer 104 that is formed in a well-known manner on counter electrode 103, an active electrode 105 that is formed in a well-known manner on electrolyte layer 104, and a second transparent conductive layer 106 that is formed in a well-known manner on active electrode 105. An alternative exemplary embodiment comprises a configuration in which a transparent substrate, a first transparent conductive layer that is formed in a well-known manner on the substrate, an active electrode that is formed in a well-known manner on the first transparent conductive layer, an electrolyte layer that is formed in a well-known manner on the active electrode, a counter electrode that is formed in a well-known manner on the electrolyte layer, and a second transparent conductive layer that is formed in a well-known manner on the counter electrode.

Any suitable transparent substrate material may be utilized for substrate 101, such as, but not limited to, tempered or untempered window glass, high-silica glass, optical glass, specialty glass, optically transparent ceramics, and optically transparent polymers or plastic. First and second transparent conducting layers comprise a transparent current collector, such as, but not limited to, tin-doped indium oxide (ITO) or fluorine-doped tin oxide (FTO).

Materials that are suitable for counter electrode 103 are well-known, such as $WO_3$, $MoO_3$, and $V_2O_5$.

In one exemplary embodiment, active electrode 105 is at least one thin, continuous film of an oxide, a nitride, an oxynitrides, a partial oxide, a partial nitride and/or a partial oxynitride of Sb, Bi, Si, Ge, Sn, Te, N, P, As, Ga, In, Al, C, Pb, I, and/or the compounds that are formed with each other. Thin switching films formed from these materials have improved durability over conventional films. To form active electrode 105 according to the subject matter disclosed herein, oxygen, nitrogen or both should be introduced into the film to produce between about 1% partial oxidation, partial nitridation and/or partial oxynitridation to about 100% oxidation, nitridation and/or oxynitridation. As another exemplary alternative embodiment, introduction of about 10% lithium oxide and/or lithium nitride could be introduced to the partial oxides, nitrides and oxynitrides to increase durability and improve the transmittance and reflectance ranges of electrochromic device 100.

Active electrode 105 may be in contact with a non-aqueous electrolyte layer 104, such as lithium perchlorate in propylene carbonate, which is unreactive toward active electrode layer 105 and is capable of supplying lithium ions for insertion in the active electrode 105. In an alternative exemplary embodiment, electrolyte layer 104 could be lithium phosphorus oxynitride, lithium aluminate, lithium silicate, or lithium aluminosilicate. In yet another alternative embodiment, counter electrode 103, which may be optically active or passive, supplies lithium ions to electrolyte layer 104 to maintain the charge balance. According to one exemplary alternative embodiment, sodium or other alkali or alkaline earth or silver ions may be substituted for lithium. The electrolyte layer may be a liquid, a solid, gel or a polymer. In one exemplary embodiment, the electrolyte is a solid. Counter electrode 103 supplies positive ions and may be transparent, opaque, reflecting, or actively electrochromic, depending upon the desired application.

Active electrode 105 may be formed to be between about 5 nm to about 5000 nm thick; with a typical thickness being between about 20 nm to about 50 nm. Counter electrode 103 could be any thickness that provides sufficient capacity to switch optically active electrode 105, and may be up to about 10,000 nm, with a typical thickness being about 200 nm.

It should be understood that the different layers and films disclosed herein could two or more layers of thin films. Additionally, the various materials disclosed herein may be doped with up to a few atom percent of another element to affect the color or electrical conductivity of the resulting electrochromic device.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. An electrochromic switching device, comprising:
   a counter electrode;
   an active electrode comprising at least one of a nitride, an oxynitride, a partial nitride, or a partial oxynitride of at least one of Sb, Bi, Si, Ge, Sn, Te, N, P, As, Ga, In, Al, C, Pb, or I; and
   an electrolyte layer disposed between the counter electrode and the active electrode, the electrolyte layer comprising at least one of an alkali or an alkaline earth metal ion.

2. The electrochromic switching device according to claim 1, wherein the active electrode comprises a nitride of between about 1% partial nitridation and about 100% nitridation of at least one of Sb, Bi, Si, Ge, Sn, Te, N, P, As, Ga, In, Al, C, Pb, or I.

3. The electrochromic switching device according to claim 1, wherein the active electrode comprises an oxynitride of between about 1% partial oxynitridation and about 100% oxynitridation of at least one of Sb, Bi, Si, Ge, Sn, Te, N, P, As, Ga, In, Al, C, Pb, or I.

4. The electrochromic switching device according to claim 1, wherein upon application of a current to the electrochromic switching device, a compound comprising at least one of the alkali or the alkaline earth metal ion and an element of the active electrode is formed as part of the active electrode.

5. The electrochromic switching device according to claim 4, wherein the alkali metal ion is Li.

6. The electrochromic switching device according to claim 1, wherein the active electrode further comprises at least one of lithium oxide or lithium nitride.

7. The electrochromic switching device according to claim 1, wherein the active electrode further comprises at least one of Ag, Cu, Al, Mg, Ti, Ta, Zn, Nb, W, or V, and their corresponding oxides, nitrides, or oxynitrides.

8. An electrochromic switching device, comprising:
   a counter electrode;
   an active electrode consisting of at least one of an oxide, a nitride, an oxynitride, a partial oxide, a partial nitride or a partial oxynitride of at least one of Sb, Bi, Si, Ge, Sn, Te, N, P, As, Ga, In, Al, C, Pb, or I; and
   an electrolyte layer disposed between the counter electrode and the active electrode, the electrolyte layer comprising at least one of an alkali or an alkaline earth metal ion.

9. The electrochromic switching device according to claim 8, wherein the active electrode consists of an oxide of between about 1% partial oxidation and about 100% oxidation of at least one of Sb, Bi, Si, Ge, Sn, Te, N, P, As, Ga, In, Al, C, Pb, or I.

10. The electrochromic switching device according to claim 8, wherein the active electrode consists of a nitride of between about 1% partial nitridation and about 100% nitridation of at least one of Sb, Bi, Si, Ge, Sn, Te, N, P, As, Ga, In, Al, C, Pb, or I.

11. The electrochromic switching device according to claim 8, wherein the active electrode consists of an oxynitride of between about 1% partial oxynitridation and about 100% oxynitridation of at least one of Sb, Bi, Si, Ge, Sn, Te, N, P, As, Ga, In, Al, C, Pb, or I.

12. The electrochromic switching device according to claim 8, wherein upon application of a current to the electrochromic switching device, a compound comprising at least one of the alkali and the alkaline earth metal ion and an element of the active electrode is formed as part of the active electrode.

13. The electrochromic switching device according to claim 12, wherein the alkali metal ion is Li.

14. The electrochromic switching device according to claim 8, wherein the active electrode further consists of at least one of lithium oxide or lithium nitride.

15. The electrochromic switching device according to claim 8, wherein the active electrode further consists of at least one of Ag, Cu, Al, Mg, Ti, Ta, Zn, Nb, W, or V and their corresponding oxides, nitrides, or oxynitrides.

* * * * *